United States Patent

[11] 3,607,638

| [72] | Inventor | Orville S. Seim<br>Wheaton, Ill. |
|------|----------|-----|
| [21] | Appl. No. | 26,575 |
| [22] | Filed | Apr. 8, 1970 |
| [45] | Patented | Sept. 21, 1971 |
| [73] | Assignee | The United States of America as represented by the United States Atomic Energy Commission |

[54] FUEL ELEMENT VENTING SYSTEM
5 Claims, 3 Drawing Figs.

[52] U.S. Cl. .................................................. 176/68, 176/79
[51] Int. Cl. ..................................................... G21c 3/10
[50] Field of Search .......................................... 176/68, 67, 87, 79, 81

[56] References Cited
UNITED STATES PATENTS

| 3,235,466 | 2/1966 | Williams | 176/68 |
| 3,459,636 | 8/1969 | Germer | 176/68 |
| 3,350,271 | 10/1967 | Maidment et al. | 176/19 |
| 3,406,094 | 10/1968 | Beisswenger et al. | 176/79 |
| 3,357,893 | 12/1967 | Gatley et al. | 176/68 |
| 3,356,585 | 12/1967 | Zebroski | 176/68 |
| 3,157,580 | 11/1964 | Williams | 176/68 |
| 3,291,698 | 12/1966 | Fortescue | 176/68 |

Primary Examiner—Carl D. Quarforth
Assistant Examiner—Gary G. Solyst
Attorney—Roland A. Anderson ABSTRACT: A fuel element for a nuclear reactor includes a vent permitting release of gaseous fission products to the coolant during operation of the reactor while ensuring that the fuel material is sealed within the fuel element at other times. This is accomplished with a valve member such as a ball or needle of low coefficient of thermal expansion disposed within a passageway in an end cap for the fuel element which is formed of a material having a high coefficient of thermal expansion. At low temperatures the vent is sealed by the ball or needle, at high temperatures it is open so that fission gases can pass therethrough.

PATENTED SEP 21 1971

3,607,638

Inventor
Orville S. Seim

Attorney 3,607,638

FUEL ELEMENT VENTING SYSTEM

CONTRACTUAL ORIGIN OF THE INVENTION

The invention described herein was made in the course of, or under, a contract with the United States Atomic Energy Commission.

BACKGROUND OF THE INVENTION

This invention relates to a fuel element for a nuclear reactor. In more detail the invention relates to a device for venting fission gases from a fuel element for a nuclear reactor. In still more detail the invention relates to a device for venting fission gases from a fuel element while the reactor is in operation which maintains a seal around the fuel material in the fuel element at other times.

In all nuclear reactors operation of the reactor causes formation of gaseous fission products—as well as nongaseous fission products—within the fuel. Evolution of these gases results in increased pressure within the fuel element and consequent swelling of the casing or cladding unless (1) the cladding is made strong enough to withstand the pressure, (2) a plenum is provided within the fuel element into which the fission gases can expand, (3) the fission gases are vented to the exterior of the reactor, or (4) the fission gases are vented to the coolant.

The first of these possibilities is impractical in a power reactor in which high burnup of the fuel is desired since cladding of the required strength would be inordinately thick. The second is practical and has been used in some reactors. However, the plenum required for a fuel element designed for high burnup must be very long making the total length of the fuel element undesirably long. The third suggestion, although very efficient, is also impractical due to the very complicated connections to the gas-venting system required.

Thus the fourth of these possibilities will frequently be the solution of choice. However, a simple vent passageway is not satisfactory since oxidation of the fuel or its bond material may occur prior to insertion of the fuel element in the reactor or after removal of the fuel element from the reactor. Thus tight closure of the fuel material and its bond material except during operation of the reactor is essential.

SUMMARY OF THE INVENTION

The invention thus pertains to a fuel element for a nuclear reactor incorporating a vent which permits release of gaseous fission products to the surroundings during operation of the reactor. Differential expansion of metals having a different coefficient of thermal expansion opens the vent when the fuel element is subjected to high temperatures and closes the vent at other times. A valve member such as a ball or needle of low coefficient of thermal expansion is disposed within a passageway through a valve body of high coefficient of thermal expansion such as a fuel element end cap. At high temperatures gases can pass between the valve member and valve body.

DESCRIPTION OF THE PREFERRED EMBODIMENT

Figure 1:
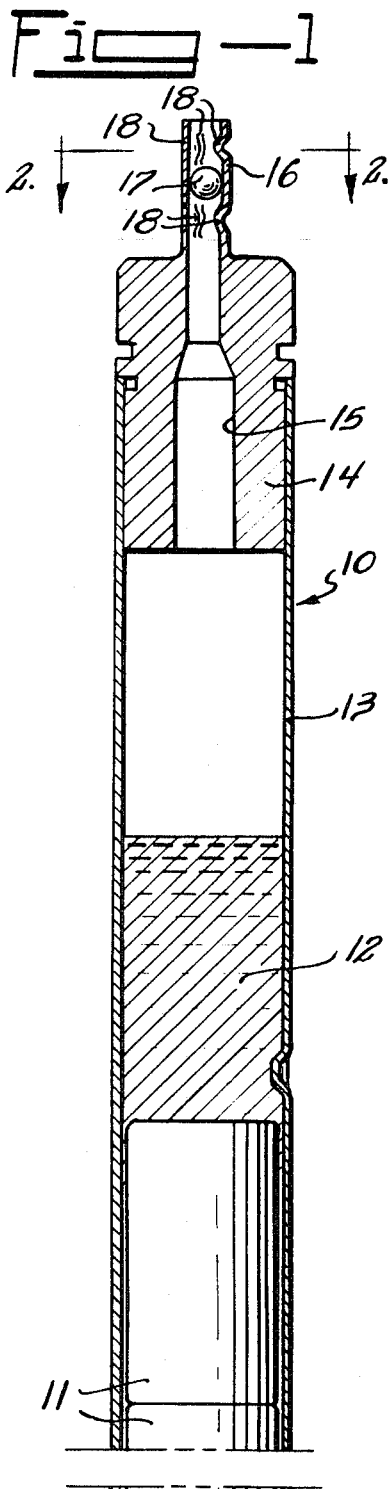
FIG. 1 is a vertical cross section showing a fuel element according to the present invention schematically.
Figure 2:
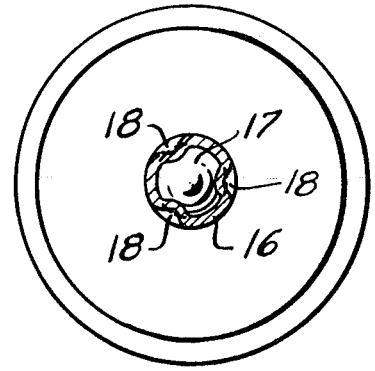
FIG. 2 is a section taken on the line 2—2 of FIG. 1.

With reference first to FIGS. 1 and 2 of the drawing a fuel element 10 for a sodium-cooled nuclear reactor includes a plurality of fuel pellets 11—which may for example be formed of uranium dioxide or a mixture of uranium dioxide and plutonium dioxide—and a bonding material 12—such as sodium or the alloy of sodium and potassium known as Nak—enclosed within a casing or cladding 13. An end cap 14 constituting the valve body of a fission product pressure relief valve is provided at one or both ends of the fuel element and has a longitudinal passageway 15 which serves as a vent for the fission product gases extending therethrough. Passageway 15 is extended past the end of end cap 14 by a tubular extension 16 which contains a ball 17 constituting the valve member of said fission product pressure relief valve which conforms closely in diameter to that of the vent 15 when the fuel element is cold. Ball 17 is restrained in position by indents 18 placed thereabove and therebelow. End cap 14 and tubular extension 16 are formed of a material having a high coefficient of thermal expansion—as stainless steel—ball 17 is formed of a material having a low coefficient of thermal expansion such as Invar.

Fuel pellets 11 and the bonding material are introduced into casing 13 and cap 14 inserted into the end of casing 13 under an inert atmosphere. Still under the inert atmosphere ball 17 is forced into tubular extension 16 of end cap 14 and the upper indents 18 formed to hold it in position. The size of the ball is such that it will form a gas seal with the tubular extension 16 at low temperatures (up to 150° F). The fuel element may then be handled in the atmosphere without danger of oxidizing the fuel or bonding material. At reactor operating temperatures (above 500° F.) the tubular extension 16 expands more than does the ball 17 so that fission product gases will be vented past the ball 17. Upon removal to a cooler temperature, the tube will shrink down upon the ball and a reasonable seal will again be obtained.

It will be appreciated that this design is most suited for use where the coolant used in the reactor is compatible with the fuel material and fuel-bonding material in the fuel element as is true in the example given above. Otherwise coolant might react with the fuel material or bonding material when the vent is open.

Figure 3:
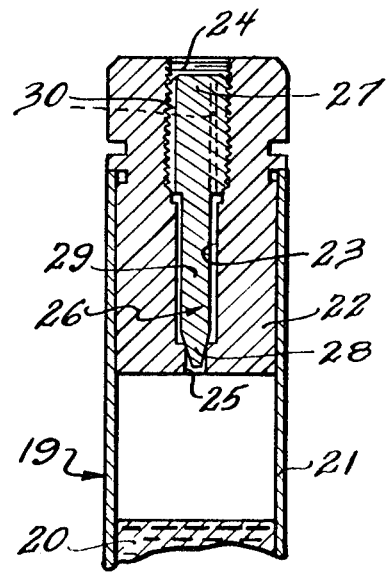
FIG. 3 is a partial vertical cross section of a different embodiment of the invention.

A second embodiment of the invention is disclosed in FIG. 3. In this embodiment a fuel element 19 includes a plurality of fuel pellets (not shown) and a bonding material 20 enclosed within a casing or cladding 21. An end cap 22 having an axial passageway 23 extending therethrough and constituting the valve body of a fission product pressure relief valve is provided at one or both ends of the fuel element. Passageway 23 has an internally threaded portion 24 near the top or exterior end of the passageway and a portion of reduced diameter 25 constituting a valve seat near the bottom or interior end thereof. A needle valve 26 constituting the valve member of a fission product pressure relief valve and having a threaded portion 27 adapted to screw into internally threaded portion 24 is sized such that conical tip 28 of elongated portion 29 thereof bears against valve seat 25 when the fuel element is cold. Notches 30 in the threads on needle valve 26 provide a path for fission product gases when the valve is open. As in the first embodiment the end cap is formed of a material having a high coefficient of thermal expansion such as stainless steel and the needle valve is formed of a material having a low coefficient of thermal expansion such as Invar.

It will be apparent that end cap 22 will expand more than does needle valve 26 when the fuel element is hot. Thus tip 28 of needle valve 26 will pull away from valve seat 25 when the fuel element is hot to provide a path for the escape of fission product gases from the fuel element during operation of the reactor. When the fuel element cools end cap 22 will shrink and the conical tip of the needle valve will again contact valve seat 25 to provide a reasonably effective gaseous seal.

The second embodiment described above will accomplish the desired action at a lower temperature differential or with materials of closer coefficients of thermal expansion than will the first embodiment. The needle may be made as long as necessary to provide the movement desired. An additional advantage is that all the assembly weld closures can be tested using equipment such as a helium mass spectrometer, prior to closure with this device.

It will be understood that the invention is not to be limited to the details given herein but that it may be modified within the scope of the appended claims.

The embodiments of the invention in which an exclusive property or privilege is claimed are defined as follows:

1. A fuel element for a nuclear reactor comprising a plurality of fuel pellets enclosed within an elongated casing provided with an end cap having an axial passageway extending therethrough, said end cap being formed of a material having a high coefficient of thermal expansion, said end cap constituting a valve body of a fission product pressure relief valve, a valve member formed of a material having a low coefficient of thermal expansion in said passageway of said cap and blocking the passage of gases therethrough when cold, the valve body expanding more than does the valve member when the assembly is hot thereby permitting escape of fission product gases therethrough.

2. A fuel element according to claim 1 wherein said end cap has a tubular extension extending outwardly from the end cap and the valve member is a ball held within said tubular extension by indents in said tubular extension.

3. A fuel element according to claim 2 wherein the end cap and tubular extension thereof are formed of stainless steel and the ball is formed of a low thermal expansion nickel steel.

4. A fuel element according to claim 1 wherein said end cap has an internally threaded portion near the exterior end of said passageway and a portion of reduced diameter near the interior end thereof, the ledge between constituting the valve seat of the valve, and including a needle-shaped valve member having a conically shaped tip and external threads near the top thereof, the valve member screwing into the passageway so that the conical tip will bear against the valve seat when the assembly is cold, and will draw away from the valve seat when the assembly is hot.

5. A fuel element according to claim 4 wherein the end cap is formed of stainless steel and the needle is formed of a low thermal expansion nickel steel.